US00RE50058E

(19) United States
(12) Reissued Patent
Brill et al.

(10) Patent Number: US RE50,058 E
(45) Date of Reissued Patent: Jul. 30, 2024

(54) SEMI-ROUND FLOOR DRAIN

(71) Applicant: INFINITY DRAIN LTD., Amityville, NY (US)

(72) Inventors: Jonathan Brill, Amityville, NY (US); Bhash Ramkarran, Amityville, NY (US); Alan Trink, Amityville, NY (US)

(73) Assignee: INFINITY DRAIN LTD., Amityville, NY (US)

(21) Appl. No.: 29/831,857

(22) Filed: Mar. 23, 2022

Related U.S. Patent Documents

Reissue of:
(64) Patent No.: Des. 890,307
Issued: Jul. 14, 2020
Appl. No.: 29/637,886
Filed: Feb. 22, 2018

(51) LOC (14) Cl. ..... 23-01
(52) U.S. Cl.
USPC ..... D23/259
(58) Field of Classification Search
USPC ..... D23/259, 260, 261, 265, 303, 304
CPC ... E03C 1/23; E03C 1/26; E03C 1/262; E03C 1/22; E03C 1/264; E03C 1/03; E03C 1/24; E03C 1/28; E03C 1/298; E03F 5/0404; E03F 5/06; F15D 1/0005; F16L 11/00; F16L 37/252; E04D 13/0409; E04H 4/1236; E04H 4/169; B08B 9/0936
See application file for complete search history.

(56) References Cited

U.S. PATENT DOCUMENTS 1,648,665 A * 11/1927 Swanson ..... E03D 11/16 285/56
2,803,348 A * 8/1957 Bingham ..... E03F 5/06 210/498
4,146,939 A * 4/1979 Izzi ..... E03F 5/0409 4/286
4,406,480 A * 9/1983 Izzi ..... E03D 11/16 285/58
4,462,123 A * 7/1984 Morris ..... E03F 5/0407 4/286
D334,051 S * 3/1993 Fell, Sr. ..... D23/262
5,492,372 A * 2/1996 Dranberg ..... E03D 11/16 285/15
D426,874 S * 6/2000 Warshawsky ..... D23/241
(Continued)

OTHER PUBLICATIONS

Office Action dated May 30, 2019 in corresponding U.S. Appl. No. 29/637,886.

(Continued)

*Primary Examiner* — Philip S Hyder
(74) *Attorney, Agent, or Firm* — F. Chau & Associates, LLC

(57) CLAIM

The ornamental design for a semi-round floor drain, as shown and described.

DESCRIPTION

FIG. 1 is a perspective view of a semi-round floor drain in accordance with the present invention;
FIG. 2 is a top plan view thereof;
FIG. 3 is a left elevational view thereof;
FIG. 4 is a bottom elevational view thereof;
FIG. 5 is a right elevational view thereof;
FIG. 6 is a front elevational view thereof; and,
FIG. 7 is a rear elevational view thereof.
The broken lines shown in the drawings illustrate portions of the semi-round floor drain and screws used with the semi-round floor drain that form no part of the claimed design.

1 Claim, 4 Drawing Sheets

Figure 1:
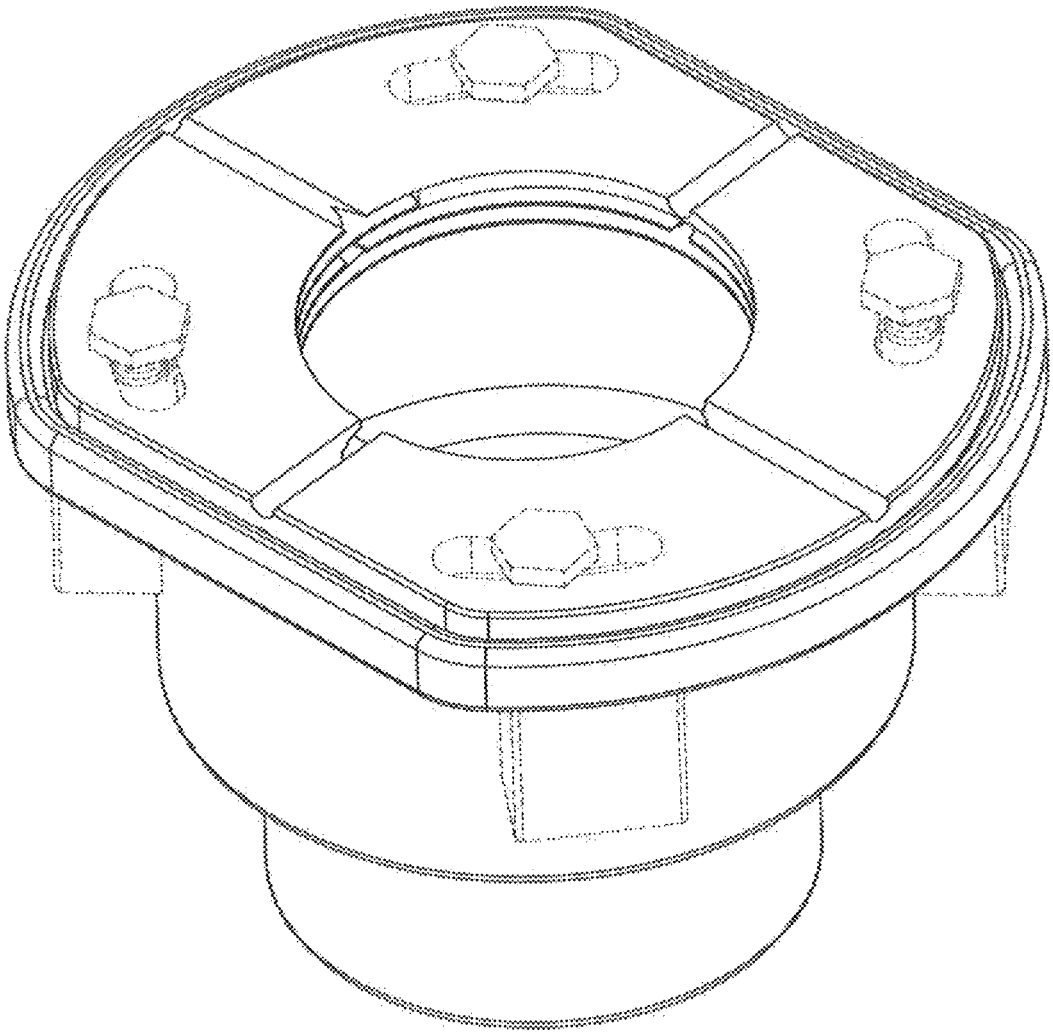
Figure 2:
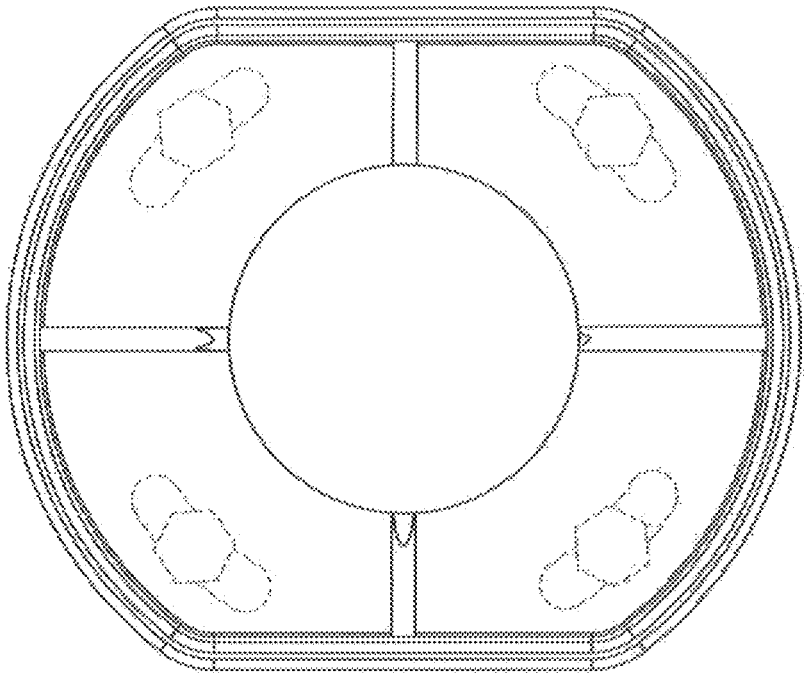
Figure 3:
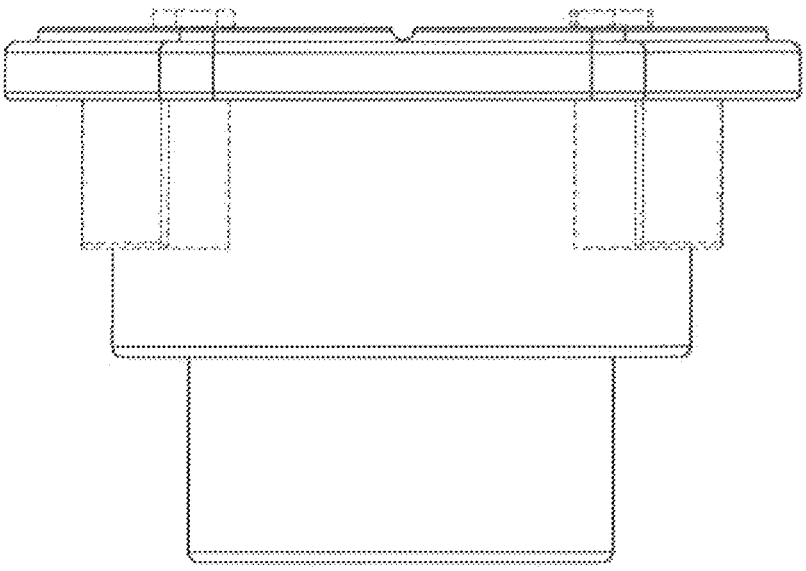
Figure 5:
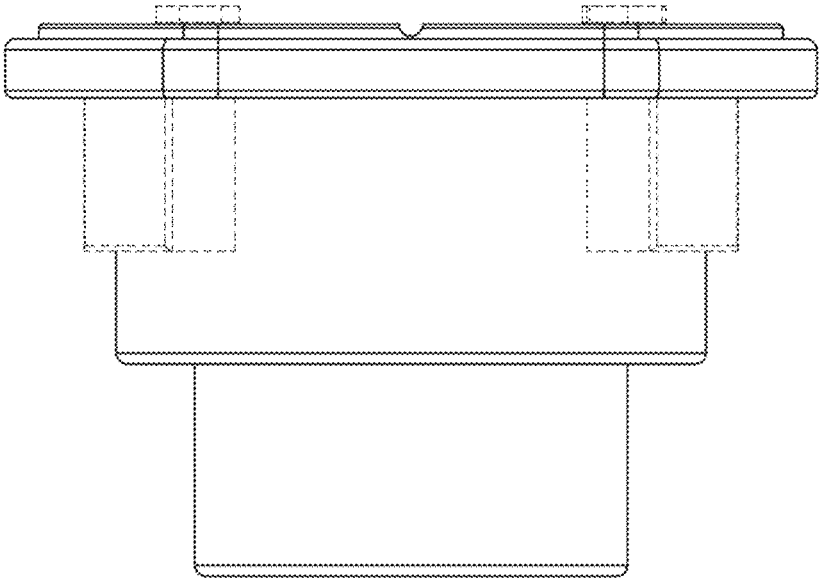
Figure 6:
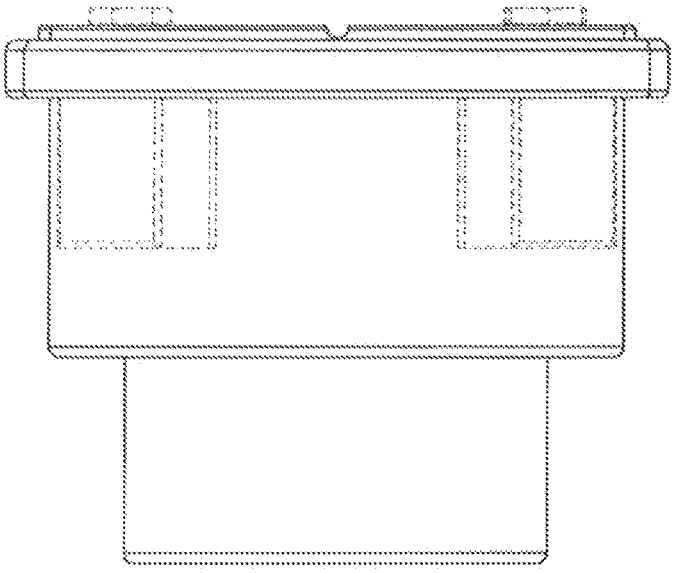
Figure 7:
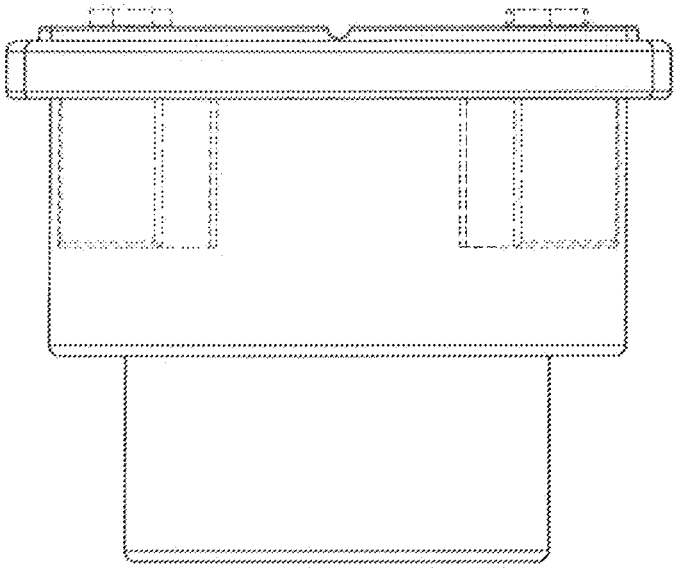

Matter enclosed in heavy brackets [ ] appears in the original patent but forms no part of this reissue; matter printed in italics indicates the additions made by reissue.

(56) References Cited

U.S. PATENT DOCUMENTS

D447,224 S * 8/2001 Barnum ..... D23/308
6,408,918 B1 * 6/2002 Hummell ..... B32B 38/1841 156/391
6,416,084 B1 * 7/2002 Mantyla ..... E03D 11/16 285/56
6,442,769 B1 * 9/2002 Phillips ..... F16L 23/12 4/252.4
D506,668 S * 6/2005 Black ..... D8/354
D509,887 S * 9/2005 Sutopo ..... D23/293.1
D542,396 S * 5/2007 Bates ..... D23/313
7,309,443 B2 * 12/2007 Kelty ..... C02F 1/325 210/167.1
D574,931 S * 8/2008 Hughes ..... D23/262
D579,092 S * 10/2008 Cummings ..... D23/313
7,624,759 B1 * 12/2009 Ismert ..... E03C 1/22 4/293
D633,605 S * 3/2011 Tanus ..... D23/308
7,964,095 B1 * 6/2011 Graybeal ..... E03F 5/04 52/302.1
D641,459 S * 7/2011 Corpuz, Jr. ..... D23/313
D647,181 S * 10/2011 Kovach ..... E03D 11/16 D23/259
D649,627 S * 11/2011 Corpuz, Jr. ..... D23/313
D693,856 S * 11/2013 Thompson ..... D15/28
D699,821 S * 2/2014 Beaudoin ..... D23/267
D715,901 S * 10/2014 Antoniello ..... E03D 11/16 D23/259
D722,366 S * 2/2015 Beaudoin ..... D23/261
D722,679 S * 2/2015 Beaudoin ..... D23/261
D725,238 S * 3/2015 Beaudoin ..... D23/261
D729,354 S * 5/2015 Kieper ..... E03D 11/16 D23/262
D739,507 S * 9/2015 Watson ..... D23/262
9,157,213 B2 * 10/2015 Beaudoin ..... E05C 3/12
D751,676 S * 3/2016 Frick ..... F16L 37/841 D23/262
D787,646 S * 5/2017 Davis ..... D23/259
D883,449 S * 5/2020 Newcomb ..... E03D 11/16 D23/259
10,774,515 B1 * 9/2020 Esquivel ..... E03D 11/17
11,186,977 B2 * 11/2021 Lorkowski ..... E03D 11/16
11,371,232 B1 * 6/2022 Ronan, Sr. ..... E03D 11/16
2002/0148039 A1 * 10/2002 Minnick ..... E03F 5/0407 4/613
2003/0115814 A1 * 6/2003 Nielsen ..... E03F 5/0406 52/302.1
2009/0145828 A1 * 6/2009 Andrei ..... F04D 29/708 210/167.1
2010/0229297 A1 * 9/2010 Eriksson ..... E03C 1/264 4/679
2011/0162132 A1 * 7/2011 Pen Nuri ..... E03D 11/16 4/252.4
2014/0208495 A1 * 7/2014 Wang ..... E03D 11/16 4/252.4
2014/0255098 A1 * 9/2014 Beaudoin ..... E05C 3/12 405/36
2014/0359927 A1 * 12/2014 Hong ..... E03D 11/16 4/252.4
2019/0106874 A1 * 4/2019 Brill ..... E03F 5/0408

OTHER PUBLICATIONS

Office Action dated Nov. 19, 2019 in corresponding U.S. Appl. No. 29/637,886.

Infinity Drain CDA 22 2" Clamp Down Drain, ABS, https://www.amazon.com/infinity-Drain-CDA-Clamp-Down/dp/B00Lc196J0/ref=sr_1_99_sspacrid=36JJRZ9Y6R71X&keywords=infinity+drain&qid=1558612699&s=gateway&sprefix=infinity+drain%2Caps%2C141&sr=8-99-spons&spec=1 (Year: 2017).

Infinity Drain CDI 22 2" Clamp Down Drain, Cast Iron, https://www.amazon.com/Infinity-Drain-Clamp-Down-Cast/dp/B008H85W1Y/ref=pd_day0_hi_60_5/143_5672237-2678107?encoding=UTF8&pd_rd_i=B008H85W1Y&pd_rd_r=b54ec78e-7d52-11e9-aef3-91e0c1ba0bc6&pd_rd_w=17K (Year: 2012).*

Infinity Drain CDS 22 2" Clamp Down Drain, ABS, https://www.amazon.com/infinity-Drain-CDA-Clamp-Down/dp/B00LC196J0/ref=sr_1_99_sspacrid=36JJRZ9Y6R71X&keywords=infinity+drain&qid=1558612699&s=gateway&sprefix=infinity+drain%2Caps%2C141&sr=8-99-spons&spec=1 (Year: 2017).*

Infinity Drain 2in. No Hub Plastic Floor Drain ICDP22; Ferguson Website: Copyright 2019; Visited online Oct. 10, 2019; https://www.ferguson.com/product/infinity-drain-2-in-no-hub-plastic floor-drain-icdp22/_/R-4642315 (Year: 2019).*

330-NL Assemblies; Lakeside Supply Company PDF p. 1; Posted online 3 years ago; 2016; Visited online Oct. 10, 2019; https://docplayer.net/23075283-Wade-specification-drainage-products.html (Year: 2016).*

330-NL Assemblies; Lakeside Supply Company PDF p. 1; WayBack Internet Archive Date Aug. 16, 2017, Posted online 11 months earlier Jul. 2016; Visited Online Oct. 10, 2019; https.//web.archive.org/web/20170816200644/https.//docplayer.net/23075283-Wade-specification-drainage-products.html (Year: 2016).*

Infinity Drain Throat ABS Clamp Down Drain Model CDA 22; Build.com website copyright date 2000-2019; Visited Online Oct. 10, 2019; https.//www.build.com/infinity-drain-cda-22/s1364853#overview.*

Clamp Down Floor Drain CDI 22; Infinity Drain Website; Visited online Oct. 10, 2019; Wayback Internet Archive Date Dec. 19, 2016; https.//web.archive.org/web/20161219181902/http://infinitydrain.com/components-and-parts?component_type=parts (Year: 2016).*

* cited by examiner

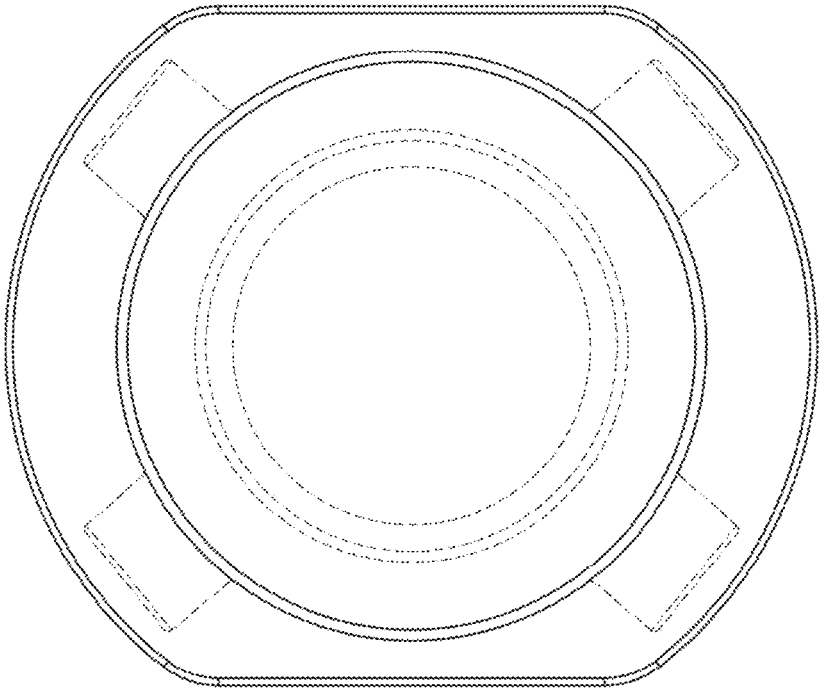
FIG. 4 (Amended)